May 26, 1953 — A. L. SIMISON — 2,639,759
METHOD OF FORMING GLASS FIBER MATS
Filed July 3, 1947
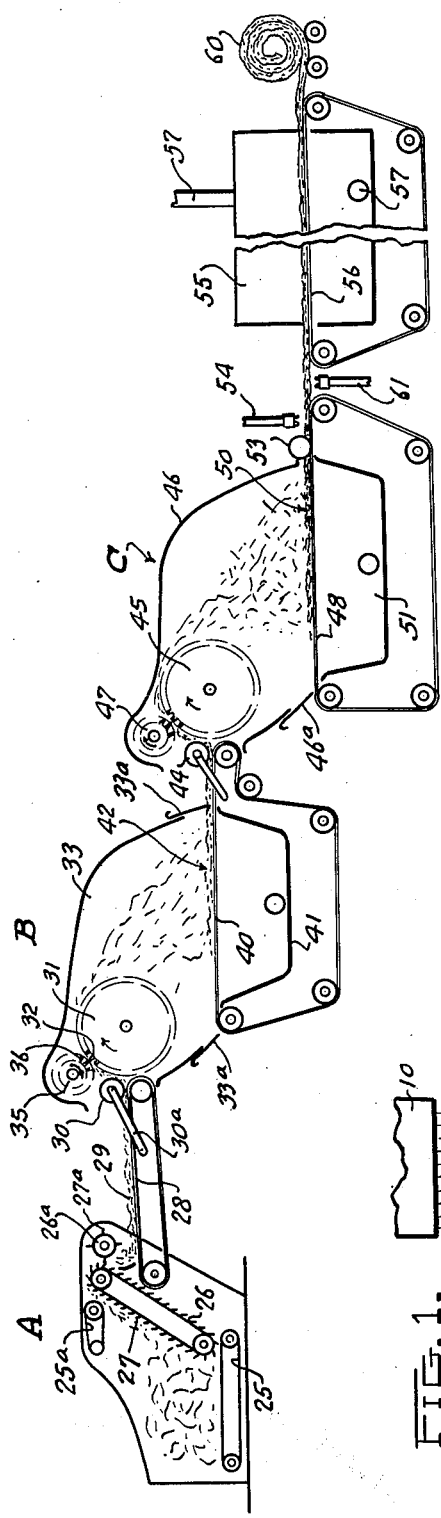
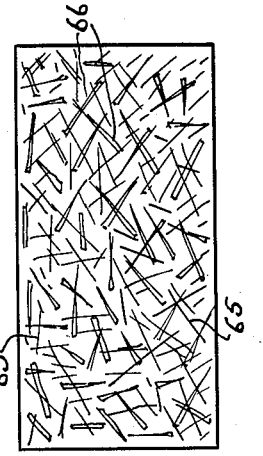
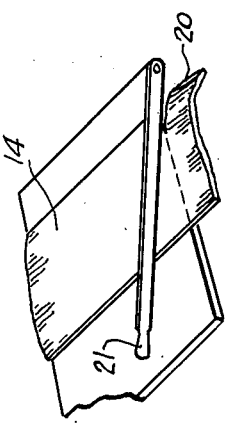
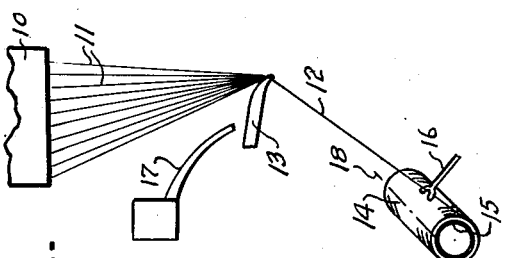
INVENTOR.
Allen L. Simison
BY
Stachin & Overman
ATTORNEYS Patented May 26, 1953

2,639,759

UNITED STATES PATENT OFFICE 2,639,759

METHOD OF FORMING GLASS FIBER MATS

Allen L. Simison, Newark, Ohio, assignor to Owens-Corning Fiberglas Corporation, a corporation of Delaware Application July 3, 1947, Serial No. 758,821

5 Claims. (Cl. 154—28)

The present invention relates to the manufacture of fibrous products and particularly mats and bats of glass fibers.

Glass fibers, as a reinforcement for plastics have been widely used in many forms because of their many advantageous properties which include high strength, dimensional stability, noncombustible nature, low moisture absorption and resistance to mildew and rot. The greatest strength in glass fiber reinforced plastics is ordinarily obtained by employing the highest ratio of glass to resin. Compact masses of glass fibers are desirable as a reinforcement and this may be achieved in several ways each of which provide certain advantages. When produced in the form of woven cloth glass fibers provide a very high strength reinforcement for plastic laminates particularly in the form of sheets or panels. A high glass density to resin ratio is obtained by reason of the closely packed relation of the fibers. The greatest strength of the material lies in the direction of the fiber length so that to obtain strength in all directions the layers of cloth are rotated with respect to each other. One limitation of this use of glass fibers results from the fact that the sheets are relatively unstretchable and are not readily deformable over intricate mold surfaces.

This difficulty is overcome to a certain extent by the use of glass fibers in the form of unwoven sheets of warps of fibers or strands in which the fibers are bonded together in parallel relation. In this form some lateral stretching of the sheet may be accomplished. Here again a high glass to resin density is achieved and strength in all directions is obtained by cross laminating the sheets.

The strength of molded or cast plastics may also be greatly increased by incorporating a chopped or macerated reinforcing material in the molding resin. Chopped glass fiber strands provide a material capable of producing a high density without hindering the flowability of the molding composition. The material forming the subject matter of the present invention comprises chopped glass fiber strands in a form which can be easily handled during molding. This material provides for a high concentration of reinforcing glass fibers in a mat or sheet form which is readily deformable in a mold and stretches without undue wrinkling.

It is an object of the present invention to produce fibrous glass mats particularly adapted for use as a reinforcement for synthetic resins or the like.

It is another object of the invention to produce mats of the above type which are highly resilient and are highly uniform in texture and density.

A further object of the invention is to provide a process for high speed efficient production of a uniform mat of glass fibers.

A still further object of the invention is to provide an apparatus for rapidly and efficiently continuously distributing bulk masses of mat forming material to produce mats of uniform character.

A still further object of the invention is to provide an apparatus by which a relatively even layer of glass fibers in the form of short lengths of strands may be separated and recombined through successive stages to produce a mat of uniform thickness in which the fibers are in haphazard intermatted arrangement.

Other objects and advantages of the invention will become apparent during the course of the following description.

The present invention comprises the manufacture of mats of fine glass fibers preferably produced from continuous type textile glass fibers formed into strands as disclosed in the patent to Slayter and Thomas 2,234,986, dated March 18, 1941. Glass fibers in this form are produced by flowing streams of molten glass, gathering the streams together to form a strand and winding the strand on a support at a high speed to attenuate the streams to very fine fibers. Each of the streams is continuously attenuated and the strands formed thereby may be produced in unlimited lengths. A binder containing a starch material or the like is usually applied to the strand as it is formed to preserve the integrity of the strand and prevent separation of the filaments during later processing operations. The single filaments in the strand may number from 100 to 200 and have a diameter within the range of .0001 to .0006 inch, the desired average diameter being .0003 inch or less.

Staple type glass fibers formed in accordance with the disclosure in Patent 2,264,345, issued December 2, 1941, to Tucker and Lannan, may also be employed as the fibrous material of the present invention. Staple glass fibers are normally produced by engaging streams of molten glass with a gaseous blast which attenuates the streams to fine filaments. The filaments are deposited by the blast on a collecting surface in a random interlaced relation and are drafted therefrom as a sliver in which the filaments are in substantial parallelism. The sliver is then processed on conventional textile machinery to further draft and/or twist it into a strand or yarn of the desired size. A binder may be applied during the processing to bind the filaments together.

The significant difference between staple and continuous type fiber strands is that staple strands are fuzzy due to the projecting ends of fibers broken during drafting and other handling operations while continuous type strands are smooth surfaced. Also the interlaced conformation of the fibers in the staple strand produces a somewhat less compact strand than the continuous type in which all of the fibers lie in substantially contacting side by side relation.

Broadly the present invention includes reducing textile glass fiber strands to short relatively uniform lengths to form the bulk mat material. In this form the severed strands become substantially integral bundles of parallelly arranged fibers in which the fibers extend substantially continuously throughout the length of the bundle. Due to the binder previously applied to the strands, the fibers are bonded together and this plus the short length of the strand, which may be ½ inch to 3 inches, forms bundles of fibers which are sufficiently stiff to prevent more than a minimum of intertangling or matting. In the interest of mat uniformity it has been discovered that the uniformity of the mat bears a substantially direct ratio to the uniformity of strand length from which the mat is made. A strand length of from 1 to 2 inches has been found to provide optimum strength and fabricating properties as will be pointed out in detail presently.

The invention will now be described in detail, reference being had to the accompanying drawings in which:

Figure 1 is a diagrammatic illustration of an apparatus for producing continuous glass fibers;

Figure 2 illustrates the fiber cutting step in the preparation of the material;

Figure 3 is a schematic illustration of a novel apparatus by which the mat forming process may be carried out; and Figure 4 is an enlarged view of a portion of a mat made in accordance with the present invention and showing the disposition of the fibers.

The production of the material of the present invention is illustrated in Figure 1 of the drawings and comprises a container 10 in which glass is reduced to a molten state and from which a plurality of streams 11 flow. The streams are gathered into a strand 12 by means of a guide 13 and the strand is wound into a package 14 on a rotatable drum 15. Traversing mechanism indicated at 16 may be employed to move the strand back and forth along the length of the drum. Preferably a slow traversing motion is employed to produce a package in which the strands lie in substantially parallel relation along the surface of the drum. This strand arrangement facilitates subsequent fabricating operations and prevents intertangling and intermatting of the fibers. As the strand is formed a binder is preferably applied at the guide 13 through a suitable supply conduit 17. The fluid binder is picked up by the strand at the guide and serves to adhere the fibers together and at the same time limit the tendency of the fibers to abrade one another. Glass fiber strands may well be made by any other suitable process known in the art.

When a sufficient amount of strand has been wound on the drum the operation may be stopped and the package removed by cutting the strands along the broken line 18. The severed package 14 is then removed and flattened into a pack to be cut into short lengths within the range of ½ inch to 3 inches as indicated by the numeral 20 in Figure 2. It will be understood that any cutting means may be employed such as the manually operated knife 21 or suitable automatic apparatus. The short lengths 20 of the strands severed from the opened package 14 may be collected in bags or other containers for transportation to the mat forming apparatus or may be fed directly into a forming machine. The material is preferably in a dry state before being subjected to the mat forming process.

As illustrated in Figure 3 of the drawings the apparatus comprises preliminary fiber distributing mechanism A including a hopper for receiving the bulk fibrous material to be fed to the machine. A feed apron or conveyor 25 forms the bottom of the hopper and carries the material into contact with a lifting apron 26 having rows of teeth 27 which disengage small amounts of the strands and carry them upward. The movement of the apron 25 provides a continuous feed to the lifting apron 26 as long as any fibrous material remains thereon. As the lifting apron conveys the fibrous material upward a short belt 25a removes any unduly large masses from the apron so that a substantially uniform layer of fibers is carried to the feeder belt 28.

In order to remove the fibrous material from the lifting apron 26 as it is carried from the hopper a stripper 26a comprising a plurality of blades 27a of leather, rubber or the like has been provided. Rotation of the stripper 26a causes the blades 27a to wipe the material from the teeth 27 so that it is deposited on the feeder belt 28.

The feeder belt 28 conveys the fibrous material as a substantially uniform sheet 29 of loosely intermatted strands toward the first picker station B. The belt is preferably driven continuously by any suitable means (not shown) to carry the sheet of material beneath a feed regulating roll 30. The feed roll 30 is weighted to provide tension on the material and is mounted on the ends of arms 30a pivoted at their opposite ends to the framework of the picker mechanism. This mounting permits movement of the roll toward and away from the surface of the feeder belt 28 as sheets of varying thickness are fed therebeneath.

As the mat issues from beneath the roll 30 it is engaged by a picker drum 31 or roll provided with teeth 32 which may be in the form of radially extending spikes arranged in parallel rows around the surface of the drum. Rotation of the drum in the direction of the arrow causes the teeth 32 to separate small tufts of fibers from the end of the mat as it issues from beneath the roll 30. The drum 31 may revolve at a relatively high surface speed, for example, in the order of 3000 feet per minute, and the fibers gathered thereby are thrown outwardly and downwardly through a hood 33 which surrounds the mechanism.

Should the spikes 32 of the roll 31 dislodge too great a mass of fibers from the end of the mat and project them into the hood 33, a non-uniform mat would be produced. Unseparated clumps or tufts of strands appear as individual bodies having no intermatted connection with the adjacent material. To guard against this possibility a secondary or worker roll 35 is provided. The roll 35 is mounted rearwardly of and adjacent the roll 31 and is provided with radially extending spikes 36 arranged in uniformly spaced rows about the periphery of the roll. Rotation of the roll 35 is in the same direction as that of the roll 31. The rolls 35 and 31 are spaced apart only sufficiently to permit clearance of the spikes and the roll 35, which is of lesser diameter than the roll 31, is rotated preferably at a lower speed. Large tufts of fibrous material picked up by the spikes on the roll 31 and which extend beyond the ends of the spikes will be engaged by the spikes 36 of the other roll and thrown rearwardly in the direction of the feed roll 30. The tearing action on the large tufts of material produced by the relative rotation of the two rolls disrupts the masses and either deposits the separated material on the incoming mat for reworking or discharges it into the hood. This action of the secondary roll provides for greater uniformity in the mat by preventing the discharge of large masses directly into the hood.

The hood 33 encloses a collecting chamber for the fibrous material discharged by the roll 31. The floor of the chamber comprises a traveling foraminous belt 40 arranged beneath the roll 31 and extending forwardly thereof. A suction chamber 41 is provided beneath the collecting surface of the belt 40 so that air passing therethrough assists in collecting the material discharged by the roll 31 into a web 42 on the surface of the belt.

Rotation of the rolls at high speed creates a substantial circulation of air adjacent the roll surface and in the direction of movement thereof in which the strands tend to become entrained. The air is drawn from the atmosphere in the vicinity of the feed roll. Suction applied beneath the belt 40 induces a flow of air from the region of the rolls toward the belt to aid in discharging the strands from the rolls. While the strands may fall by gravity to the surface of the belt it is believed that their deposition may be regularly controlled by the provision of even a low degree of suction thus overcoming any tendency of the fibrous bodies to follow uncontrolled air currents set up within the hood. The suction further withdraws the air induced by the rotating rolls. Additional control of the fiber deposition may be provided by including adjustable dampers 33a at the forward and rear ends of the hood 33 adjacent the belt 40. The dampers may be adjusted to regulate the amount of air drawn into the hood in the region of the belt.

The web 42 may be formed in any desired thickness by regulating the speed of the conveyor belt 40. Increasing the speed of the belt produces a thin mat while decreasing the speed provides for a greater mat thickness. However, it has been found that at a thickness of about ¼ inch a mat of substantially uniform thickness suitable for further processing may be formed. The mat is carried by the conveyor 40 to a second picker station C which is a substantial duplication of the picker station B just described. A feed roll 44 together with the movement of the conveyor 40 feeds the mat into a picker roll 45 from which the strands are discharged into a hood 46 similar in construction to the hood 33. Also at this station an auxiliary picker or worker roll 47 adjacent the roll 45 is provided to assure a more uniform distribution of the strands by preventing the accidental discharge of large tufts by the roll 45 in the same manner as previously described.

As the redistributed strands are discharged from the roll they are collected on a second traveling foraminous belt 48 to form a finished mat or web 50. A suction chamber 51 is provided beneath the belt so that the strands are again collected and condensed in the final arrangement. At this stage also the thickness of the mat is regulated by the speed of the conveyor. A gate roll 53 mounted at the end of the hood 46 prevents the escape of loose particles of the material and further serves to compact and condense the mat. A damper 46a similar in construction and use to the dampers 33a may be provided adjacent the belt 48 at the end of the hood opposite from the roll 53.

As the mat 50 issues from the hood 46 a suitable binder or impregnant may be applied thereto as by spraying from spray guns indicated at 54. This binder and its application may be such that the mat is completely saturated or only sufficient binder may be applied to maintain or assure integrity of the mat. Binders found suitable for the present application include dilute emulsions of polystyrene, methyl methacrylate or polyvinyl acetate, each of which may be dried or cured at a low degree of heat. The fluid binder further tends to condense the mat and hold the strands in compacted relation. Such binders may be present in the finished mat within the range of 3 to 12½ per cent depending upon the degree of stiffness desired in the finished product.

It is customary to partially cure or set the binder so that the material can be readily handled. For this purpose an oven 55 may be provided through which the mat 50 is transported by means of a conveyor 56. Air circulating means 57 may be provided to cure the binder of the impregnated mat so that it may be coiled into a roll 60. If desired, binder may also be sprayed against the bottom surface of the mat by arranging spray guns 61 between the ends of the conveyors 58 and 56 and in this way a more thorough impregnation of the mat may be effected.

Figure 4 illustrates on an enlarged scale the general arrangement of the lengths of cut strands as they are disposed in the mat. It may be noted that the short lengths of strands appear relatively straight and while heterogeneously and haphazardly arranged are not intertangled nor matted together to substantial extent. It will be noted further that some of the fibrous material appears as fine separate strands 65 while other fibrous material as indicated at 66 appears as relatively wide dense bodies composed of parallelly arranged fibers. This occurs as a result of the picking operations in which some of the glass fiber strands which are adhered together more strongly by the binder applied during the strand forming operation are not completely separated into individual filaments.

In the present invention complete separation of the fibers of the strands into individual filaments is undesirable since it is distinctly preferable to retain as many strands as possible in order to obtain the highest possible strength characteristics. The greatest strength is due to the presence of large numbers of bundles of parallelly arranged fibers in the mat. Masses of haphazardly arranged single filaments produce the undesirable effect that when stressed the forces are not equally distributed throughout the material and the filaments break one by one. Also single glass filaments in substantial numbers tend to produce fluffy masses within the mat and prevent a uniform compacting of the strand material. It is therefore essential to eliminate as far as possible the inclusion of masses of materials of dissimilar character. This may be accomplished in part by first providing a mat material of substantially uniform structure and secondly, controlling the amount of separation of the mass.

The strand length found most suitable for fabrication into mats of the present type has been determined to be within the range of 1 to 2 inches. At this length the strands tend to resist complete separation by the action of the picker and are sufficiently short so that no intetangling is encountered. In addition, the strands lie substantially straight in the mat because of their inherent stiffness and the added effect of the original textile binder. A particular advantage of the present type of mat as a resin reinforcement when impregnated with a resin in a softened or partially cured state is that the mat may be stretched or deformed over relatively sharp curves or corners without adversely and unduly affecting the thickness of the mat or destroying its integrity.

The extent of separation of the fibers or strands is affected in part by the spacing and number of the picker spikes as well as their shape. Closely spaced spikes tend to pick smaller bundles of fibers in a more uniform manner from the advancing end of the mass of material than would widely spaced spikes, thereby resulting in a more uniform mat. Spikes of a pointed gradually tapering form have a greater tendency to split small bundles of strands or fibers than blunt spikes or those having sharply tapered points. For this reason spikes having a short tapered point are preferred since the fibrous mat material is originally substantially in the desired form and requires only a uniform distribution. Variations in the fiber or strand length, handling and picking operations, etc., will produce mats of different fiber structure in a range starting with mats made up of fibers substantially all collected in bundles and extending to mats in which substantially no bundles of fibers are present.

The present type of mat is well suited for providing bulk to plastic structures and may be employed as a material to which sheets of fabric are adhered to produce a desired surface on the molded article.

Modifications may be resorted to within the spirit of the invention and the scope of the appended claims.

I claim:

1. The method of forming a mat of glass fibers as a reinforcement for plastics which comprises cutting into uniformly short lengths bundles of strands of glass fibers formed by flowing streams of molten glass, gathering and attenuating the streams to filaments, binding the filaments into strands and collecting the strands in masses, distributing masses of the short-length strands on a moving surface, conveying the masses of strands to a mass-disintegrating station, breaking up the masses of strands at said station into individual strands and bundles of strands, conveying the individual strands and bundles of strands by an air stream to a collecting surface on which the strands and bundles of strands are collected into a pad, delivering the pad to a second disintegrating station, disrupting the pad into strands and bundles of strands, conveying the strands and bundles of strands from the second disintegrating station by an air stream to a second collecting surface to form a mat of substantially uniform thickness, and applying a resinous impregnant to the mat to coat the strands and bundles of strands.

2. The method of forming a mat of glass fibers as a reinforcement for plastics which comprises cutting masses of strands of glass fibers into substantially uniform short-length bundles, distributing the short-length bundles of strands on a moving surface, delivering the bundles of strands to a picker station, disintegrating portions of the short-length bundles at said station to individual strands and partially opened bundles of strands in a confined zone, entraining the partially opened bundles of strands and individual strands in an air stream passing through the confined zone, conveying the strands and strand bundles by the air stream onto a collecting surface to form a mat, feeding the mat to a second picker station, disrupting the mat at said second station and redistributing the strands and bundles of strands in a second confined zone, entraining the redistributed strands and bundles of strands in an air stream passing through the second confined zone, conveying the strands and bundles of strands from the second confined zone by the air stream to a second surface to form a mat, applying a resinous binder to the mat to coat the strands and bundles of strands, and conveying the binder-impregnated mat through a heated zone to partially cure the binder.

3. The method of continuously forming a mat of glass fibers in which the fibers are in the form of strands and bundles of strands of short lengths which comprises conveying masses of the bundles of short-length strands to a mass-disintegrating station to disrupt the masses into individual strands and bundles of strands, collecting and compacting the strands and bundles of strands into a mat by an air stream, conveying the mat to a second station, tearing the mat at the second station into strands and bundles of strands, redistributing the strands and bundles of strands, entraining the redistributed strands and bundles of strands in a second air stream and conveying them to a collecting surface, and collecting the strands and bundles of strands into a final mat of uniform density wherein the strands and bundles of strands are disposed in a substantial parallelism to the major faces of the mat.

4. The method of forming a comparatively thin mat of glass fibers as a reinforcement for plastics which includes the steps of severing masses of strands of glass fibers into integral bundles of strands of short length, delivering masses of said bundles onto a moving surface, feeding said masses of bundles from the surface to a mass-disintegrating station, opening the mass of bundles at said station into strands and bundles of strands, conveying the strands and bundles of strands by an air stream to a collecting surface, collecting and compacting the strands and bundles of strands into a mat, feeding the mat to a mat-disrupting station, tearing the mat at the latter station into individual strands and bundles of strands into a mat, feeding strands and bundles of strands from the mat-disrupting station by an air stream, collecting the strands and bundles of strands upon a second surface and compacting them by a second air stream into a mat in which the strands and bundles of strands are disposed in substantial parallelism to the major faces of the mat, and applying a resinous impregnant to the formed mat.

5. The method of producing a mat of intermatted glass fibers in which the fibers are in the form of short-length strands and bundles of strands bonded in intimate contact, said fibers being disposed in substantial parallelism in the strands and bundles of strands, which comprises passing masses of bundles of strands through a mass-disintegrating station to separate the strand masses into strands and bundles of strands, conveying the strands and bundles of strands by an air stream to a collecting surface, feeding the collected strands and bundles of strands to a second disintegrating station, redistributing the strands and bundles of strands at the second disintegrating station, finally collecting the redistributed strands and bundles of strands into a mat of uniform density in which the strands and strand bundles are disposed in substantial parallelism to the major faces of the mat, applying a resinous impregnant to the mat, and curing the impregnant to bond the strands and strand bundles in fixed relation.

ALLEN L. SIMISON.

References Cited in the file of this patent

UNITED STATES PATENTS

| Number | Name | Date |
|---|---|---|
| 1,420,162 | Toles | June 20, 1922 |
| 1,881,932 | Powell | Oct. 11, 1932 |
| 1,928,699 | Neal | Oct. 3, 1933 |
| 1,948,395 | Powell | Feb. 20, 1934 |
| 2,233,433 | Smith | Mar. 4, 1941 |
| 2,467,291 | Brelsford et al. | Apr. 12, 1949 |
| 2,477,555 | Roberts et al. | July 26, 1949 |